H. A. IVATT.
CRANK SHAFT FOR STEAM ENGINES.
APPLICATION FILED JAN. 20, 1909.
1,016,504.
Patented Feb. 6, 1912.
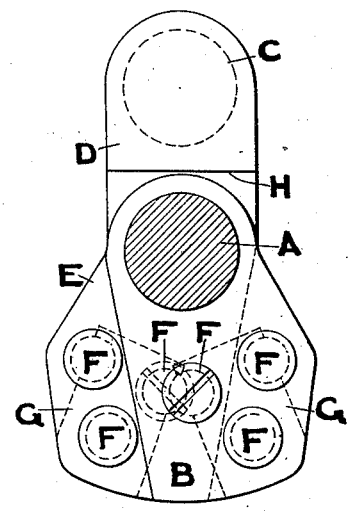
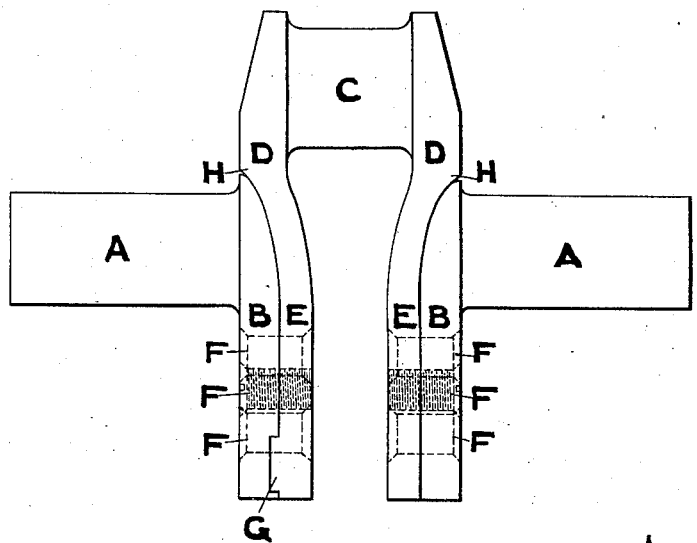
WITNESSES
Allan Bennett.
Samuel Burgess.
INVENTOR
HENRY ALFRED IVATT.
Per John E. Walsh
ATTORNEY.

UNITED STATES PATENT OFFICE.

HENRY ALFRED IVATT, OF DONCASTER, ENGLAND.

CRANK-SHAFT FOR STEAM-ENGINES.

1,016,504. Specification of Letters Patent. Patented Feb. 6, 1912.

Application filed January 20, 1909. Serial No. 473,377.

*To all whom it may concern:*

Be it known that I, HENRY ALFRED IVATT, a subject of the King of Great Britain and Ireland, residing at Doncaster, in the county of York, England, have invented a new and useful Improvement in Crank-Shafts for Steam-Engines and other Purposes, of which the following is a specification.

This invention relates to an improved construction of crank shaft, intended for use in steam or internal combustion engines, but applicable also with like effect to other types of engines or machines.

My said invention is designed with the object, firstly, of obtaining greater flexibility in the shaft (thus avoiding the breakages ordinarily caused by too rigid construction), and of securing this flexibility in a single crank or when two or more closely adjacent cranks are employed; secondly, of obtaining a more perfectly balanced shaft; and thirdly, of facilitating and cheapening the renewal of the various parts when necessary.

*Description of drawings.*—Figure 1 is an end elevation and Fig. 2 a front elevation of a single throw balanced crank shaft embodying the present invention.

According to my said invention the crank shaft A is formed in two or more sections, each having an extended cheek B on the end adjacent to the crank, on the side opposite to the crank pin. The crank pin C and its crank arms D D are forged, cast, or built up in one piece, separate from the shaft, and each crank arm D has an extended cheek E which corresponds in size and shape to the cheek B on the shaft. The two pairs of cheeks B B and E E are adapted to form a double coupling and counterbalance for each crank, each coupling being secured by means of bolts, rivets, screws, or other suitable attachments F, and being further locked in position by means of a projection G on the cheek E engaging with a corresponding recess in the cheek B. The two counterbalance couplings of each crank may be so arranged that one is more or less in advance of the other, thus, one counterbalance coupling is slightly in front of and the other counterbalance coupling slightly behind the center line of the shaft A and crank pin G, this arrangement causing one edge of each coupling to project sufficiently beyond the edge of the adjacent coupling to allow for the manipulation of the rivets or bolts, while still forming a perfect counterbalance for the crank. The cheeks are curved inward or slightly contracted together, each outer cheek B being correspondingly curved and fitting beneath a slight shoulder H, so as to form a more compact crank.

I claim:

In a crank shaft, the combination of shaft sections having extended cheeks thereon on the side opposite the crank pin and locking projections formed thereon, a crank section intermediate between each pair of shaft sections and having corresponding extended cheeks on the side opposite the crank pin, fastening means for securing adjacent pairs of extended cheeks together to form a double coupling and counter-balance for each crank, the said counter-balance couplings being so arranged that one end of each coupling projects beyond the edge of the adjacent coupling so as to allow for the manipulation of the fastening means.

HENRY ALFRED IVATT.

Witnesses:
JOHN E. WALSH,
ALLAN BENNETT.

Copies of this patent may be obtained for five cents each, by addressing the "Commissioner of Patents, Washington, D. C."